United States Patent
Arling

(10) Patent No.: US 9,154,838 B2
(45) Date of Patent: Oct. 6, 2015

(54) SYSTEM AND METHOD FOR IDENTIFYING SOCIAL MEDIA INFLUENCERS

(71) Applicant: UNIVERSAL ELECTRONICS INC., Santa Ana, CA (US)

(72) Inventor: Paul D. Arling, Irvine, CA (US)

(73) Assignee: Universal Electronics Inc., Santa Ana, CA (US)

( * ) Notice: Subject to any disclaimer, the term of this patent is extended or adjusted under 35 U.S.C. 154(b) by 0 days.

(21) Appl. No.: 14/191,580

(22) Filed: Feb. 27, 2014

(65) Prior Publication Data
US 2014/0282659 A1  Sep. 18, 2014

Related U.S. Application Data

(60) Provisional application No. 61/784,555, filed on Mar. 14, 2013.

(51) Int. Cl.
| | |
|---|---|
| *H04N 7/16* | (2011.01) |
| *H04N 21/442* | (2011.01) |
| *H04N 21/234* | (2011.01) |
| *H04N 21/25* | (2011.01) |
| *H04N 21/81* | (2011.01) |
| *G06Q 30/02* | (2012.01) |
| *H04N 7/173* | (2011.01) |

(52) U.S. Cl.
CPC ..... *H04N 21/44222* (2013.01); *G06Q 30/0251* (2013.01); *H04N 21/23424* (2013.01); *H04N 21/252* (2013.01); *H04N 21/812* (2013.01)

(58) Field of Classification Search
CPC .......... H04N 21/44222; H04N 21/252; H04N 21/23424; H04N 21/812; G06Q 30/0251
USPC ...................................................... 725/14, 24
See application file for complete search history.

(56) References Cited

U.S. PATENT DOCUMENTS

| | | | |
|---|---|---|---|
| 7,519,658 B1 | 4/2009 | Anglin et al. | |
| 7,933,843 B1 | 4/2011 | Von Groll et al. | |
| 2011/0191372 A1 | 8/2011 | Kaushansky et al. | |
| 2011/0282860 A1 | 11/2011 | Baarman et al. | |
| 2012/0036531 A1* | 2/2012 | Morrow | 725/34 |
| 2012/0215903 A1 | 8/2012 | Fleischman et al. | |
| 2013/0014136 A1 | 1/2013 | Bhatia et al. | |
| 2013/0073620 A1* | 3/2013 | Ghosh | 709/204 |
| 2014/0240352 A1* | 8/2014 | Kuncl et al. | 345/633 |
| 2014/0344855 A1* | 11/2014 | Morrow | 725/34 |

OTHER PUBLICATIONS

ISA/US, International Search Report and Written Opinion issued on PCT Application No. PCT/US14/19205 mailed Jul. 25, 2014, 11 pages.

* cited by examiner

*Primary Examiner* — Hoang-Vu A Nguyen-Ba
(74) *Attorney, Agent, or Firm* — Greenberg Traurig, LLP

(57) ABSTRACT

Data indicative of first and second members of a social group, a media content accessed by the first and second members of the social group, and a time at which the media content was accessed by the first and second members of the social group is collected. A system then compares the received data to determine if the second member of the social group accessed the same media content as the first member of the social group and if the second member of the social group accessed the same media content within a predetermined amount of time. When the second member of the social group accessed the same media content as the first member of the social group within the predetermined amount of time the first member of the social group is identified as a social influencer.

15 Claims, 5 Drawing Sheets

SYSTEM AND METHOD FOR IDENTIFYING SOCIAL MEDIA INFLUENCERS

RELATED APPLICATION INFORMATION

This application claims the benefit of U.S. Provisional Application No. 61/784,555, filed on Mar. 14, 2013, the disclosure of which is incorporated herein by reference in its entirety.

BACKGROUND

Emerging "Social TV" enabling technologies such as described in, for example, U.S. Pat. No. 7,519,658, entitled "Automatic Blogging During Media Viewing," are enabling viewers of media content to interact with selected peer groups for the purpose of sharing viewing preferences, comments, opinions, etc. Increasingly, such interactions may occur in real time, i.e., while the participants are actively viewing media content.

SUMMARY

The following describes a system and method for identifying those members who exert the most influence on their particular social groups, particularly as concerns media viewing. To this end, and by way of example only, this determination may be made by monitoring user activity patterns in order to identify those members of a group whose media selection choices are echoed by other members of a peer group within a relatively short period of time. Such methods may be implemented by provisioning a reporting feature as part of, for example, a smartphone program guide app used in conjunction with a "Facebook" brand or other social media site sharing service; programming within a "smart" TV or set top box ("STB") or a home media server device; and/or any other appropriate device wherein content selection requests may be effected. Regardless of exact host device, such a reporting feature may capture media content selection requests and forward these to a server for analysis and identification of trendsetting individuals.

A better appreciation of the objects, advantages, features, properties, and relationships of the systems and methods described hereinafter will be obtained from the detailed description and accompanying drawings which set forth illustrative embodiments which are indicative of the various ways in which the principles of the systems and methods may be employed.

BRIEF DESCRIPTION OF THE DRAWINGS

For use in better understanding the exemplary systems and methods described herein, reference may be had to preferred embodiments shown in the following drawings in which.

DESCRIPTION OF THE INVENTION

Figure 1:
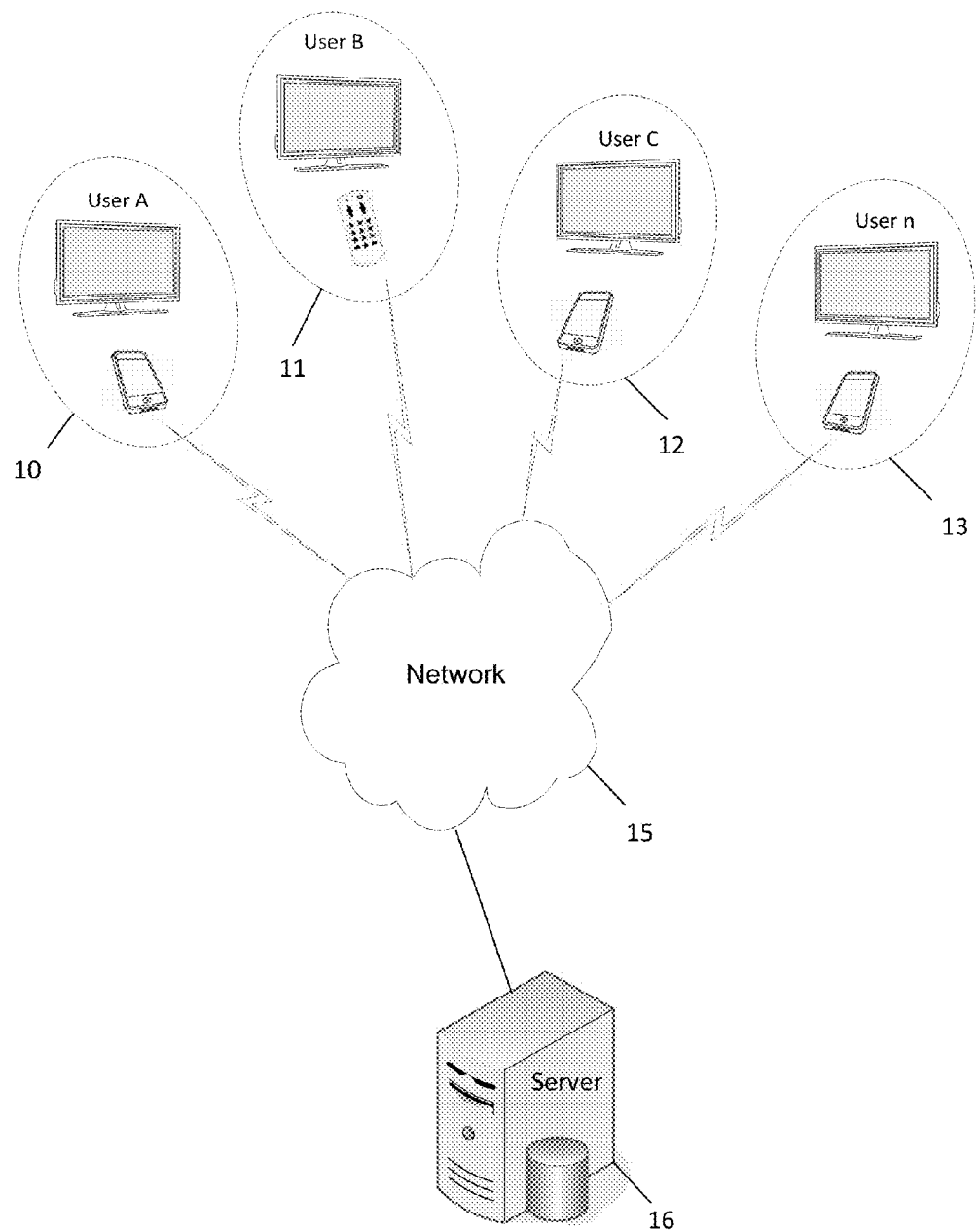
FIG. 1 illustrates an exemplary system in which one or more users view media and share information with others concerning the same.
Figure 2:
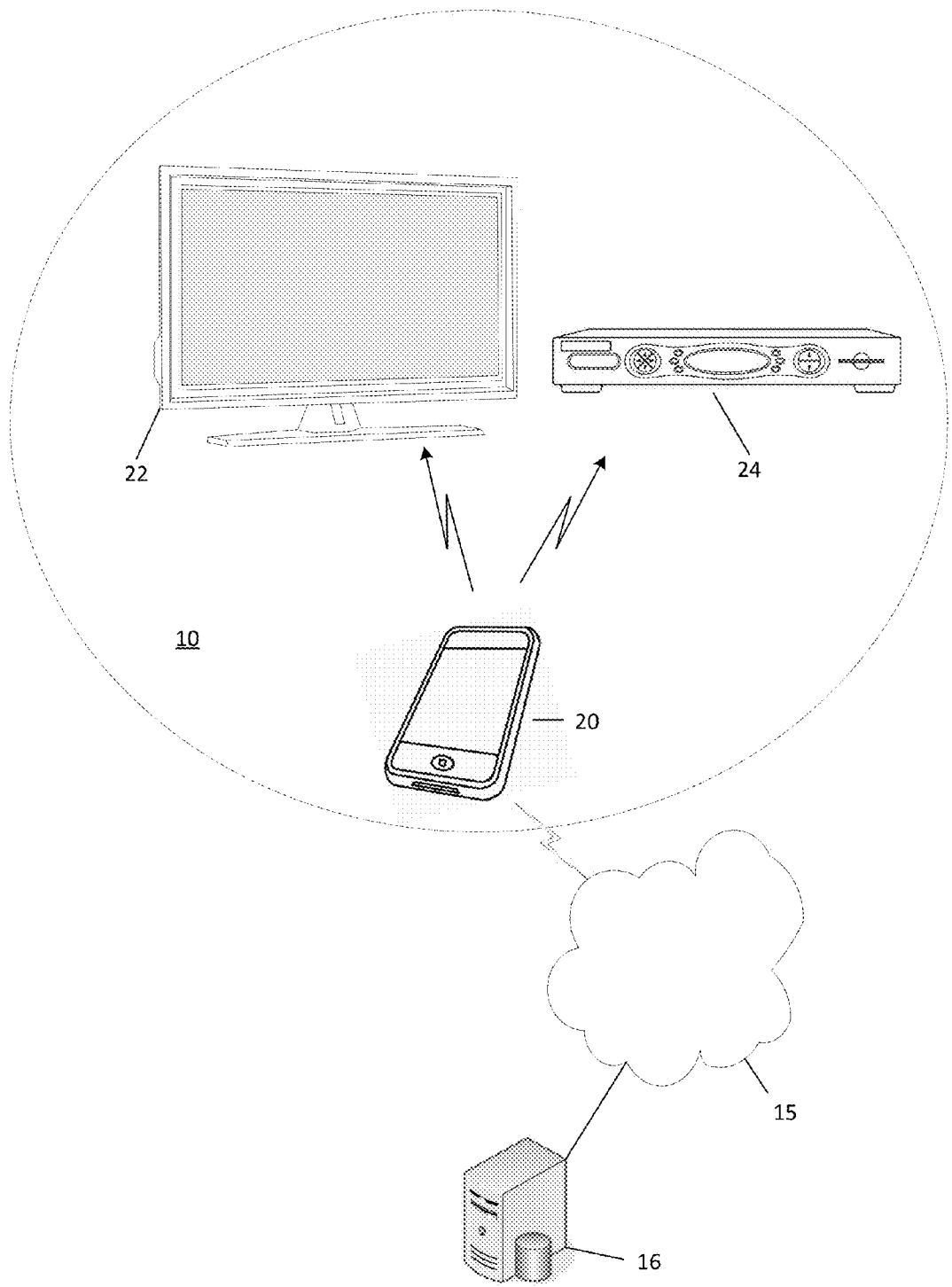
FIG. 2 illustrates an exemplary system in which a controlling device is used to capture information in the system illustrated in FIG. 1.
Figure 3:
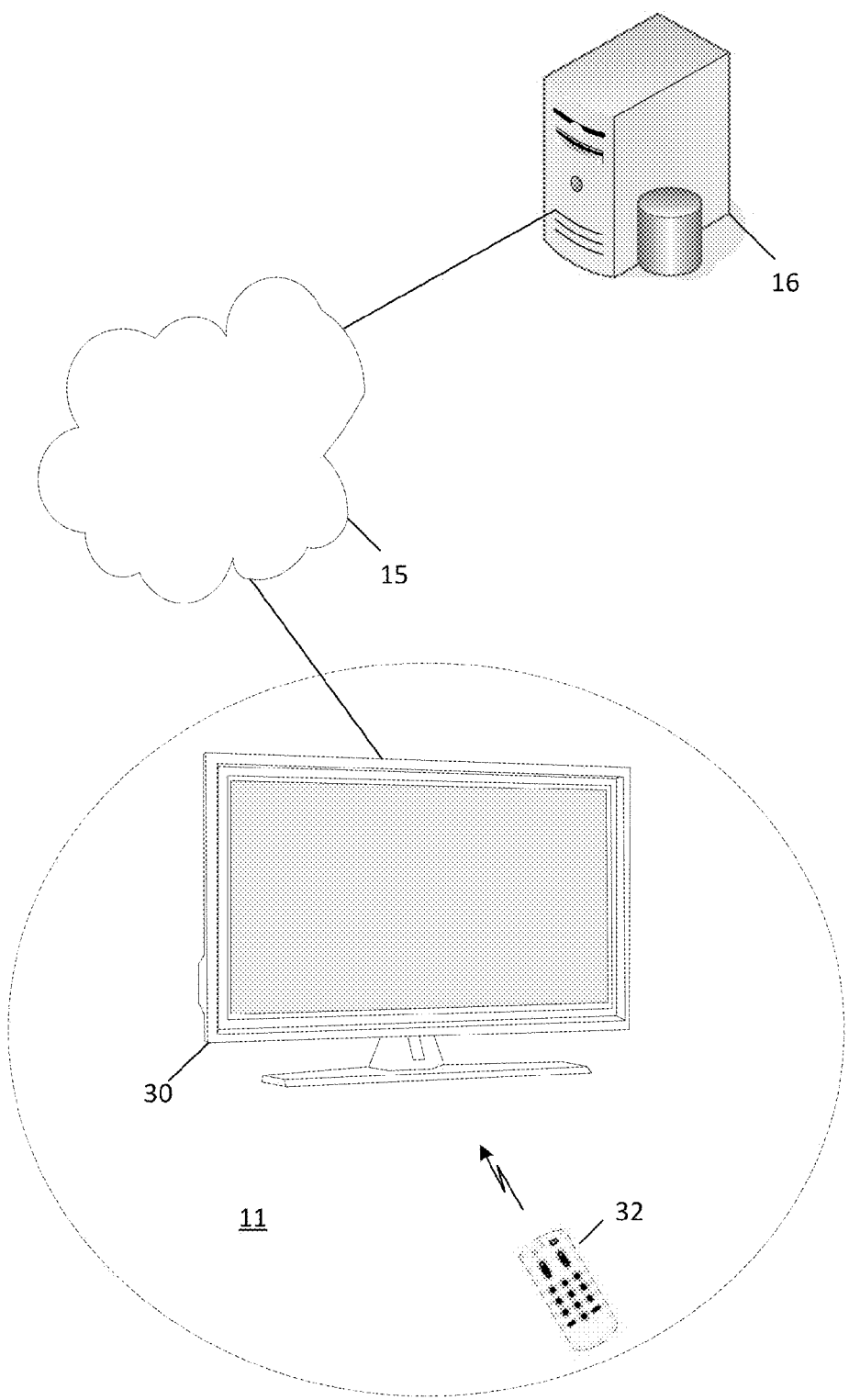
FIG. 3 illustrates an exemplary system in which a controllable appliance is used to capture information in the system illustrated in FIG. 1.

With reference to FIG. 1, the media viewing choices of a group of users A, B, C, . . . n (users of systems 10, 11, 12, . . . 13) who are associated with one another as a social group, e.g., are "friends" or otherwise linked to one another on a social website, may be reported to a central server 16 via a wide area network 15 such as the Internet. Within the systems 10, 11, 12, . . . 13, an individual user's equipment configurations may include a TV 22 and STB 24 controlled by an app resident on a smartphone 20 as illustrated in FIG. 2; a smart TV 30 controlled by a conventional remote control device 32 as illustrated in FIG. 3; or any other appropriate arrangement of equipment, for example a smart STB, a personal computer, a digital media receiver such those offered for example by Roku Inc., etc. Such arrangements of equipment can be collectively referred to as a "home theater." As will also be appreciated, the actual command path for media selection may in some instances include other devices not illustrated, for example a remote control and/or program guide app resident in smart phone 20 may relay channel selection commands to TV 22 or STB 24 via an IR blaster device, a WiFi router, a cable headend server, etc. For the sake of clarity, such intermediate devices have been omitted from the illustrations.

Figure 4:
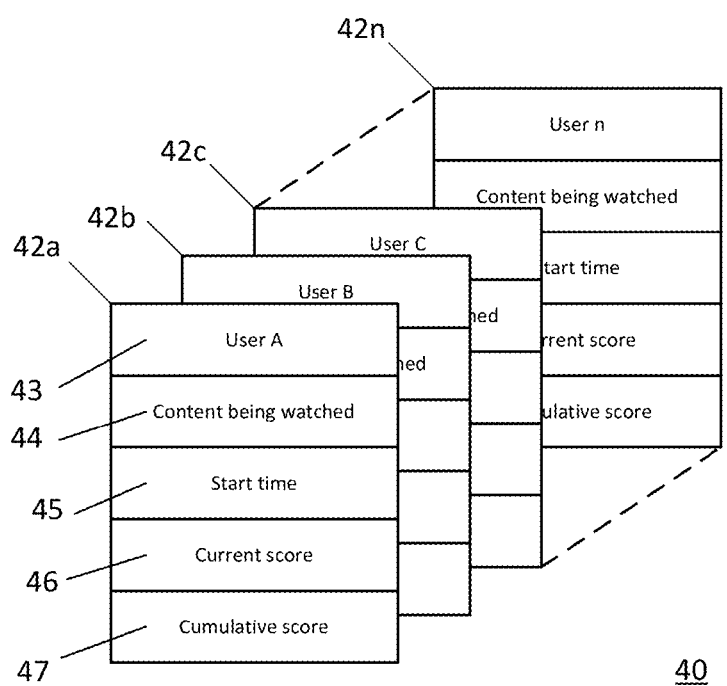
FIG. 4 illustrates an exemplary data store in which is stored captured data for use in identifying social media influencers.

An exemplary set of database records such as may be utilized by server 16 to store received media selection data from users comprising each particular peer group is illustrated in FIG. 4. A set of records 40 corresponding to one particular peer group of users A, B, C, . . . n may comprise individual records 42a, 42b, 42c, . . . 42n each corresponding to a particular user. Each record may in turn comprise a series of fields as follows:

User ID 43. Identification of the specific user to which this record applies. Depending upon the particular application, this may take the form of a username, a network address, a subscriber number, a physical address, a device address, an anonymous ID number, or any other convenient tag as may be appropriate for the specific application for which the data is to be utililized. Thus, it will be appreciated that in some use cases the user that will be controlling the home entertainment equipment may be required to provide log-in information to a device associated with the home entertainment system and/or the server 16 whereby the user may be identified and/or other means, such as by using biometrics, visual recognition, or the like may be provided for this same purpose.

Content currently being viewed ID 44. Identification of the media stream currently being rendered at this user location. This may comprise any convenient item which may serve to uniquely identify a media stream, for example a provider and channel number, a URL, program guide data or pointer thereto, hash tag, watermark, sampling of media, etc. As will be appreciated, in some embodiments different types of identification may be used for different types of media stream. Preferably, the usage is consistently applied across all user records. In some embodiments a null entry may also be valid in this field, e.g., when it is reported that a user's equipment is powered down. In this context, the techniques described in co-pending U.S. patent application Ser. No. 13/758,307 "System and Method for User Monitoring and Intent Determination," of common ownership, may be further utilized to refine the reported data by capturing actual user presence in a viewing area.

Start time 45. The time at which this user commenced viewing the media stream identified in filed 44 above. As will be seen hereafter, this time entry may be used to determine which one of several users was the first to select the indicated media stream and which of several users thereafter selected the same indicated media stream. Also, as will be appreciated, in certain embodiments the time value may be normalized either at the server 16 or by the reporting device(s) in order to compensate for differences in local time at multiple reporting locations.

Current score 46 and Cumulative score 47. These two fields are used in the measurement of this user's influence over the viewing habits of others in the group, as will be described hereafter.

Figure 5:
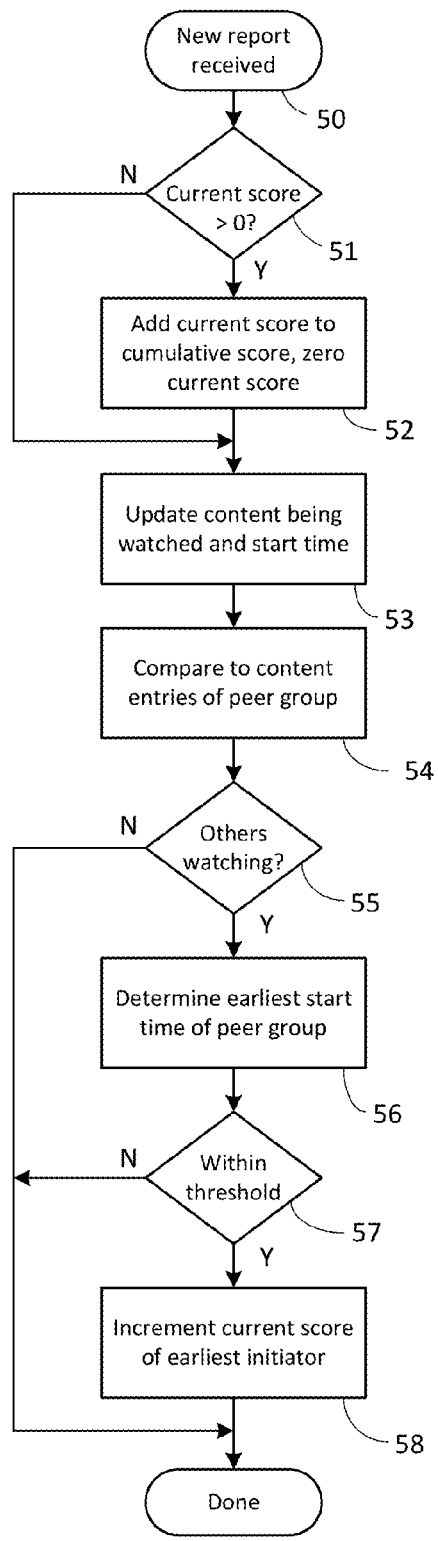
FIG. 5 illustrates an exemplary method for identifying social media influencers.

Turning now to of FIG. 5, an exemplary method which may be applied by server 16 when processing incoming media selection reports is illustrated in flowchart form. At step 50, a media selection report may be received from one of user locations A through n. Such a report may comprise, for example, a site identification corresponding to a particular user (e.g., a user ID itself, or a value from which a user ID may be determined for example from server registration records), a media stream identifier as described previously, and a time stamp. At step 51, the appropriate user record 42*a*, 42*b*, 42*c*, ... 42*n* may be accessed and the current score value 46 examined. If the current score value is non-zero, at step 52 the current score is added to this user's cumulative score 47 and the current score is zeroed. Next, at step 53 this user's currently viewed content ID 44 and start time 45 are updated to those values just received. If necessary, start time may be normalized at this step as well.

Next, at steps 54 and 55, the just-reported content ID is compared to that of all other user records in the social group. (Unless the report is a null value, i.e., a value indicative of the equipment being powered off, in which case further processing may be skipped.) By way of specific example, if the just-received report was for user B, then user records corresponding to users A and C through n in the social group would be examined. If no match is found considering the content ID, processing is complete. If, however, a match or matches are found considering the content ID, at step 56 it may then be determined which member of the peer group has the earliest start time value, and thereafter at step 57 whether the difference between that start time and the currently-reporting user's start time is less than a predetermined threshold value, i.e., the currently-reporting user selected the media stream within a certain period of time after that initial viewer. Depending on the embodiment, the particular threshold value used may be a fixed value, or may be variable based on factors such as type/genre of content, time of day, user profile, or any other pertinent factor. If the time difference is within the threshold, then at step 58 the current score field of the user corresponding to the earliest viewer may be incremented. Depending on the embodiment, such an increment may a fixed value (i.e., one unit) or may weighted, for example based of length of calculated time difference, type/genre of content, time of day, a combination thereof, or any other pertinent factor. As noted above, when a new report is received for the user, the value in current score field (if any) will be added to the user's cumulative score.

As can be seen, in this manner the magnitude of the cumulative score values may thus serve to indicate which users tend to influence the media viewing choices of others in the peer group, i.e., by measuring the relative frequency with which other members of the group follow a particular user's viewing selections within a short period of time. A user ranking based on these values may be extracted by server 16 and used for statistical purposes or for activities such as targeted advertising, upcoming attraction promotions, viewing incentives, subscription enhancements, etc.

It will also be understood that the method steps described herein are not intended to be limiting. Rather, the method steps can be rearranged and reordered as necessary to meet the objectives described herein. For example, the value in the user's current score field can be added to their cumulative score after a predetermined time of period has lapsed with the current score field then being zeroed as the passing of the predetermined time can indicate that this user is no longer influencing the viewing habits of others in his/her social group. It will likewise be appreciated by those of skill in the art that the method steps described herein could be performed by a processing device of the server 16 executing instructions stored on a non-transitory computer-readable memory device.

All patents/published applications for patent cited herein are hereby incorporated by reference in their entirety.

What is claimed is:

1. A non-transitory computer-readable memory device having stored thereon instructions which, when executed by a processing device, perform steps comprising:
   receiving first data indicative of a first member of a social group, a media content accessed by the first member of the social group, and a time at which the media content was accessed by the first member of the social group;
   receiving second data indicative of a second member of a social group, a media content accessed by the second member of the social group, and a time at which the media content was accessed by the second member of the social group;
   comparing the received second data to the received first data to determine if the second member of the social group accessed the same media content as the first member of the social group and if the second member of the social group accessed the same media content as the first member of the social group within a predetermined amount of time; and
   when it is determined that the second member of the social group accessed the same media content as the first member of the social group within the predetermined amount of time causing the first member of the social group to be identified as a social influencer;
   wherein the first data and the second data are received from at least one of a media accessing appliance or a device adapted to control functional operations of the media accessing appliance of the first member of the social group and the second member of the social group, respectively, and wherein the first member of the social media group is different than the second member of the social media group.

2. The non-transitory computer-readable media as recited in claim 1, wherein the instructions provide an influencer score to the first member of the social group when identifying the first member of the social group as a social influencer.

3. The non-transitory computer-readable media as recited in claim 2, wherein the provided influencer score is a fixed value.

4. The non-transitory computer-readable media as recited in claim 2, wherein the provided influencer score is a variable value.

5. The non-transitory computer-readable media as recited in claim 4, wherein the provided influencer score is varied considering the time at which the media content was accessed by the second member of the social group as compared to the time at which the media content was accessed by the first member of the social group.

6. The non-transitory computer-readable media as recited in claim 4, wherein the provided influencer score is varied considering a genre of the media content being accessed.

7. The non-transitory computer-readable media as recited in claim 4, wherein the provided influencer score is varied considering a time of day at which the media content is being accessed.

8. The non-transitory computer-readable media as recited in claim 1, wherein the predetermined amount of time is a fixed value.

9. The non-transitory computer-readable media as recited in claim 1, wherein the predetermined amount of time is a variable value.

10. The non-transitory computer-readable media as recited in claim 9, wherein the predetermined amount of time is varied considering a genre of the media content being accessed.

11. The non-transitory computer-readable media as recited in claim 1, wherein the predetermined amount of time is varied considering a time of day at which the media content is being accessed.

12. The non-transitory computer-readable media as recited in claim 1, wherein the data indicative of the first member and the second member of a social group comprises at least one of a username, a network address, a subscriber number, a physical address, a device address, and an anonymous ID number.

13. The non-transitory computer-readable media as recited in claim 1, wherein the data indicative of a media content accessed by the first member and second member of the social group comprises at least one of a channel number, a URL, program guide data, a pointer to program guide data, a hash tag, a media sampling, and a watermark.

14. The non-transitory computer-readable media as recited in claim 1, wherein the data indicative of a time at which the media content was accessed by the first member and the second member is normalized when received.

15. The non-transitory computer-readable media as recited in claim 1, wherein the instructions normalize the data indicative of a time at which the media content was accessed by the first member and the second member.

\* \* \* \* \*